(12) United States Patent
Bosquet et al.

(10) Patent No.: US 10,137,591 B2
(45) Date of Patent: Nov. 27, 2018

(54) TOOLING AND A METHOD FOR WEAKENING AN OUTLINE IN A THIN PLASTICS CARD

(71) Applicant: IDEMIA FRANCE, Colombes (FR)

(72) Inventors: Olivier Bosquet, Colombes (FR); Gregory Simmoneaux, Colombes (FR)

(73) Assignee: IDEMIA FRANCE, Colombes (FR)

( * ) Notice: Subject to any disclaimer, the term of this patent is extended or adjusted under 35 U.S.C. 154(b) by 0 days.

(21) Appl. No.: 14/902,142

(22) PCT Filed: Jun. 25, 2014

(86) PCT No.: PCT/FR2014/051609
§ 371 (c)(1),
(2) Date: Dec. 30, 2015

(87) PCT Pub. No.: WO2015/001228
PCT Pub. Date: Jan. 8, 2015

(65) Prior Publication Data
US 2016/0368161 A1    Dec. 22, 2016

(30) Foreign Application Priority Data
Jul. 1, 2013   (FR) ..................................... 13 56359

(51) Int. Cl.
*B26F 3/00* (2006.01)
*G06K 19/077* (2006.01)
*B26D 3/08* (2006.01)

(52) U.S. Cl.
CPC .............. *B26F 3/002* (2013.01); *B26D 3/085* (2013.01); *G06K 19/07739* (2013.01)

(58) Field of Classification Search
CPC ..... G06K 19/07739; B26F 3/002; B26F 1/14; B26D 3/085; B26D 7/26; B21D 45/08;
(Continued)

(56) References Cited

U.S. PATENT DOCUMENTS

| 4,435,885 A | * | 3/1984 | Suzuki | ................... | H01M 4/20 29/2 |
| 4,774,865 A | * | 10/1988 | Wallis | ................... | B21D 28/16 267/119 |

(Continued)

FOREIGN PATENT DOCUMENTS

| DE | 19513282 A1 | 10/1996 |
| EP | 2608116 A1 | 6/2013 |

(Continued)

OTHER PUBLICATIONS

International Search Report dated Sep. 29, 2014, for International Application No. PCT/FR2014/051609 filed Jun. 25, 2014, pp. 1-5.

*Primary Examiner* — Ghassem Alie
(74) *Attorney, Agent, or Firm* — MH2 Technology Law Group, LLP

(57) ABSTRACT

Disclosed are a method of weakening an outline in a thin plastic card and tooling for performing the method. The method may include several operations, including a go punching step by means of a go punch presenting a solid shape substantially identical to the outline and suitable for punching the thin plastic card along a go direction against a die presenting a hollow shape substantially identical to the outline and in alignment with the go punch in order to be able to receive material pushed by the go punch, and a return punching step by means of a return punch presenting a solid shape substantially identical to the outline in alignment with the go punch and suitable for punching the thin plastic card along a return direction opposite to the go direction. Also disclosed is a thin plastic card including at least one outline weakened by such a method.

17 Claims, 5 Drawing Sheets

(58) Field of Classification Search
CPC ...... B21D 28/34; B21D 28/346; B21D 28/16;
B21D 45/003; B21D 45/006; Y10T
83/2096; Y10T 83/0448; Y10T 83/2133;
Y10T 83/2122; Y10T 83/173; Y10T
83/9423
USPC .... 83/13, 23, 111, 123, 128, 76.1, 124, 125,
83/127, 129, 130, 131
See application file for complete search history.

(56) References Cited

U.S. PATENT DOCUMENTS

| | | | | |
|---|---|---|---|---|
| 4,951,537 | A * | 8/1990 | Bennett | B21D 45/006 267/119 |
| 5,320,013 | A * | 6/1994 | Nonami | B21D 28/10 83/13 |
| 6,401,510 | B1 * | 6/2002 | Morse | B26D 3/085 72/327 |
| 2007/0144230 | A1 * | 6/2007 | Fujimura | B21D 28/16 72/337 |
| 2014/0366694 | A1 * | 12/2014 | Konieczny | B26F 1/40 83/27 |

FOREIGN PATENT DOCUMENTS

| | | |
|---|---|---|
| FR | 2783202 A1 | 3/2000 |
| FR | 2960819 A1 | 12/2011 |

* cited by examiner

Section C-C

Section D-D

TOOLING AND A METHOD FOR WEAKENING AN OUTLINE IN A THIN PLASTICS CARD

CROSS-REFERENCE TO RELATED APPLICATIONS

This application is a U.S. National Stage application of International Application No. PCT/FR2014/051609 filed 25 Jun. 2014, which claims priority to French Application No. 1356359 filed 1 Jul. 2103, the entire disclosures of which are hereby incorporated by reference in their entireties.

BACKGROUND OF THE INVENTION

The present invention relates to shaping a thin plastics card in order to form a weakened outline in such a card that is suitable for being broken subsequently, e.g. manually.

By way of example, such a weakened outline addresses a problem of distributing a smart card for mobile telephony, also known as a subscriber identity module (SIM) card. By way of example, such a card may present a small format known as ID-000 or 2FF as defined by the ISO 7816 standard, comprising a thin plastics card with a substantially rectangular outline of 25 millimeters (mm)×15 mm, and with one of its corners cut off at 45°. Because of its small format, such a SIM card runs the risk of being lost while it is being handled. It is therefore advantageously issued while secured to a distribution medium constituted by a thin plastics card of larger format, typically an ID-1 format having a substantially rectangular outline of 85.60 mm×53.98 mm.

Advantageous means for providing such a distribution medium consist in taking a thin plastics card of large format and weakening it along an outline that corresponds to the small format. The weakened outline of the small format card can thus be broken, typically by hand, in order to separate the small format card from the large format distribution medium.

Such a small format outline may define a SIM card of 2FF format. It may also define a SIM card of one of the new formats known as 3FF or 4FF that are even smaller, or of any other format. The outline may also define a format adapter between two of these formats. Vendors of smart cards for mobile telephony do not know in advance which format will be necessary so they propose a large format card including one or more such SIM cards, together with one or more format adapters, of outlines that may potentially be nested.

With a distribution medium, a weakened outline serves to hold together two parts until they are separated. With a format adapter, the function of a weakened outline is either to hold a small format card secured to a large format adapter if the assembly is to be used in a large format receptacle, or else to enable the small format card to be separated if said card is to be used in a small format receptacle.

It can therefore be seen that a weakened outline must be strong enough to ensure that the two parts it connects together can remain and be used together, while also allowing them to be separated, preferably by hand and without using tooling.

At least two methods are known for making such a weakened outline.

A first method is shown in FIGS. 1a and 1b and consists in cutting the outline 12 through the entire thickness E of the thin plastics card 11 over at least a major portion of the length of the outline 12. Thus, in the example shown, the outline 12 is weakened by two holes 14 and 15. The small format card 13 arranged inside these two holes is secured to the large format card 11 by two bridges 16 and 17 only. The small format card 13 is separated by breaking said bridges 16 and 17, typically by hand. The tooling needed for weakening the outline in that way comprises a respective punch of the cutter type for each of the holes 14 and 15.

The drawback of that method is that the holes 14 and 15 are necessarily of considerable width. It is thus not possible to make a plurality of outlines weakened in this way that are close to one another. This is problematic with the new format that require nested outlines that can be very close together.

A second method, shown in FIGS. 2a and 2b, consists in forming a partial cut 24 all along the outline 22 advantageously through a majority fraction of the thickness E of the thin plastics card 21. This partial cut 24 is preferably made along the entire length of the outline 22. As shown in FIG. 2b, it may comprise a single notch 24. Alternatively, it may comprise two facing notches. The small format card 23 is secured of the large format card 21 only by the uncut residual thickness 26. The small format card 23 is separated by breaking said residual thickness 26, typically by hand. The partial cut 24 advantageously serves as a guide during breakage. The tooling needed for making such a weakened outline comprises at least one blade suitable for making the partial cut(s) 24.

A drawback of that method is that the blades are fragile and need frequent replacement.

An alternative method capable of being used, where necessary, in addition to the method of the prior art is very desirable.

The invention provides a method of weakening an outline in a thin plastics card, the method comprising: a go punching step by means of a go punch presenting a solid shape substantially identical to the outline and suitable for punching the thin plastics card along a go direction against a die presenting a hollow shape substantially identical to the outline and in alignment with the go punch in order to be able to receive material pushed by the go punch; and a return punching step by means of a return punch presenting a solid shape substantially identical to the outline in alignment with the go punch and suitable for punching the thin plastics card along a return direction opposite to the go direction.

According to another characteristic, the return stroke of the return punch is substantially equal to the go stroke of the go punch.

According to another characteristic, the sum of the go stroke of the go punch plus the return stroke of the return punch is strictly less than the thickness of the thin plastics card so as to leave remaining a residual thickness of intact material.

According to another characteristic, the difference between the thickness of the thin plastics card and the sum of the go stroke of the go punch plus the return stroke of the return punch lies in the range 5% to 100% of the thickness of the thin plastics card.

According to another characteristic, the return punch is arranged in the die.

According to another characteristic, the return punch includes return means loaded by thrust from the return punch along the go direction so as to urge the return punch along the return direction when the thrust ceases.

According to another characteristic, the method further includes a step of making a relaxation cut arranged in the proximity of the outline and suitable for deforming so as to release stresses created by the go and return punching steps.

According to another characteristic, the method also weakens at least one second outline by means of: a second go punching step by means of a second go punch presenting a solid shape substantially identical to the second outline and suitable for punching the thin plastics card in a second go direction against a second die presenting a hollow shape substantially identical to the second outline and in alignment with the second go punch in order to be capable of receiving the material pushed by the second go punch; and a second return punching step by means of a second return punch presenting a solid shape substantially identical to the second outline in alignment with the second go punch and suitable for punching the thin plastics card along a second return direction opposite to the second go direction.

According to another characteristic, the second go direction is identical to the go direction.

According to another characteristic, the second go direction is identical to the return direction.

According to another characteristic, the second outline circumscribes the outline.

According to another characteristic, the distance between the first outline and an adjacent second outline is greater than or equal to 300 micrometers (μm).

The invention also provides tooling suitable for performing such a method to weaken an outline in a thin plastics card.

The invention also provides a thin plastics card including at least one outline weakened by such a method.

According to another characteristic, the outer profile of the outline, after breaking the material of the residual thickness, presents a substantially flared shape opening out facing the go direction.

According to another characteristic, said flare presents a mean slope relative to the normal lying in the range 10 to 100, and preferably in the range 4° to 8°.

According to another characteristic, the inner profile of the outline after breaking the material of the residual thickness presents a shape that is substantially S-shaped.

Other characteristics, details, and advantages of the invention appear more clearly from the following detailed description given by way of indication with reference to the drawings, in which:

FIGS. 1a and 1b, described above, show a first embodiment of the prior art respectively in plan view and in section view on A-A;

FIGS. 2a and 2b, described above, show a second embodiment of the prior art respectively in plan view and in section view on B-B;

Figure 5:
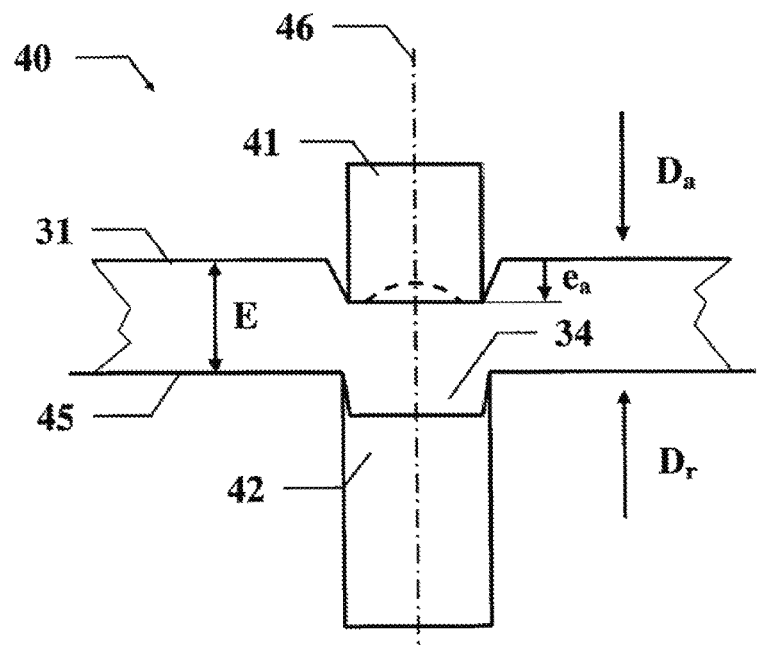
FIGS. 5 to 7 show the successive steps in the method of weakening an outline.
Figure 6:
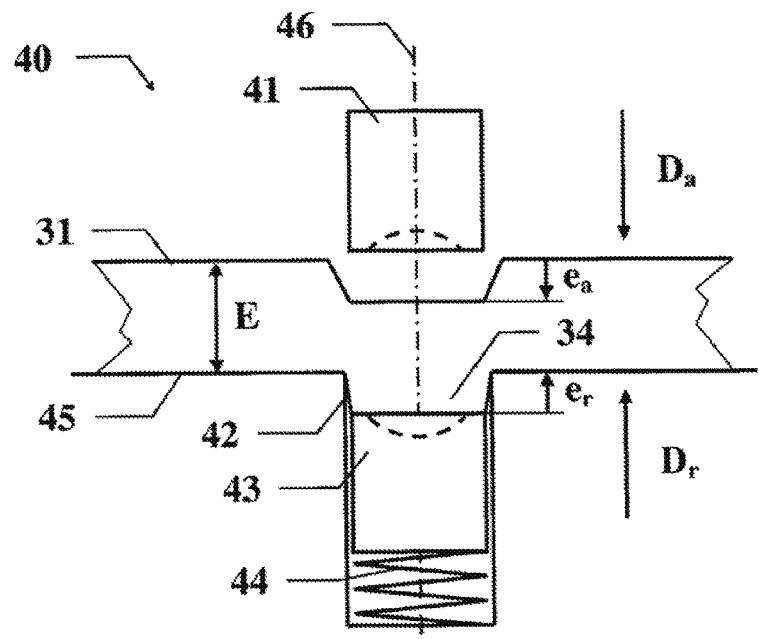

FIG. 5: go punching step;

FIG. 6: withdrawal of go punch; and

Figure 7:
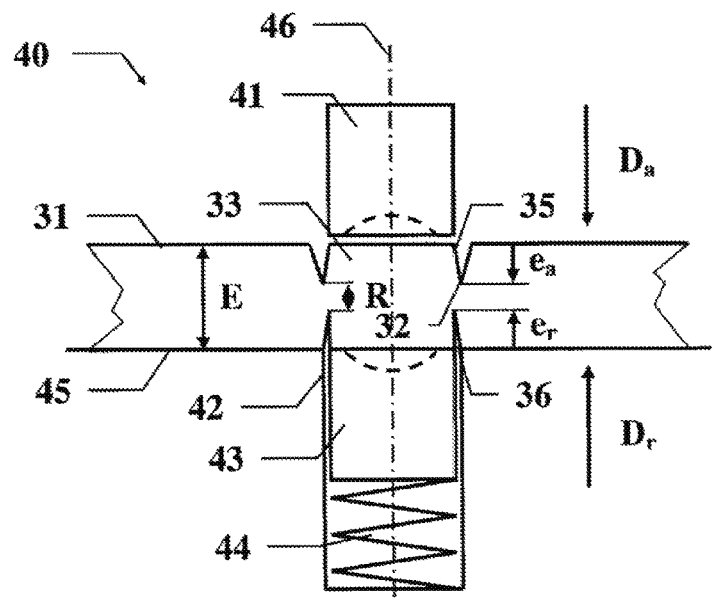
Figure 8:
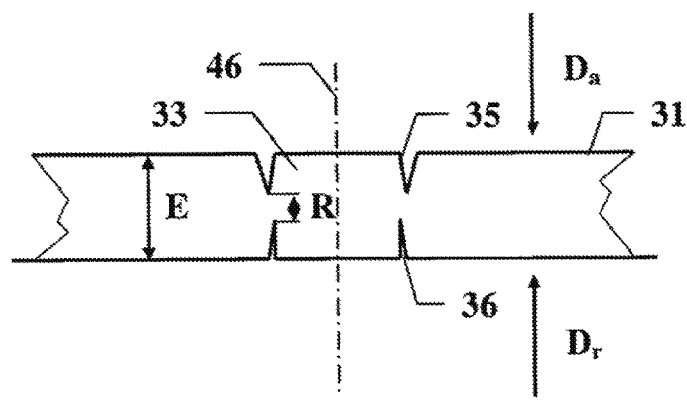
Figure 9:
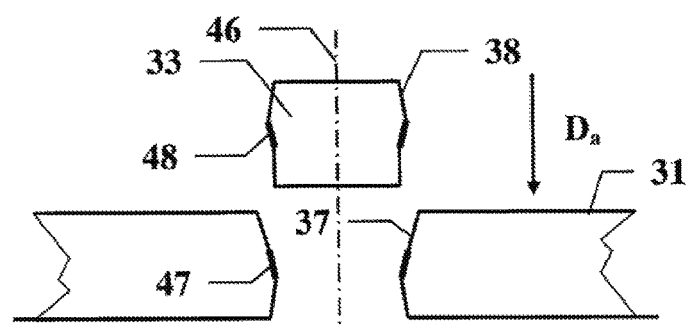
Figures 10A, 10B:
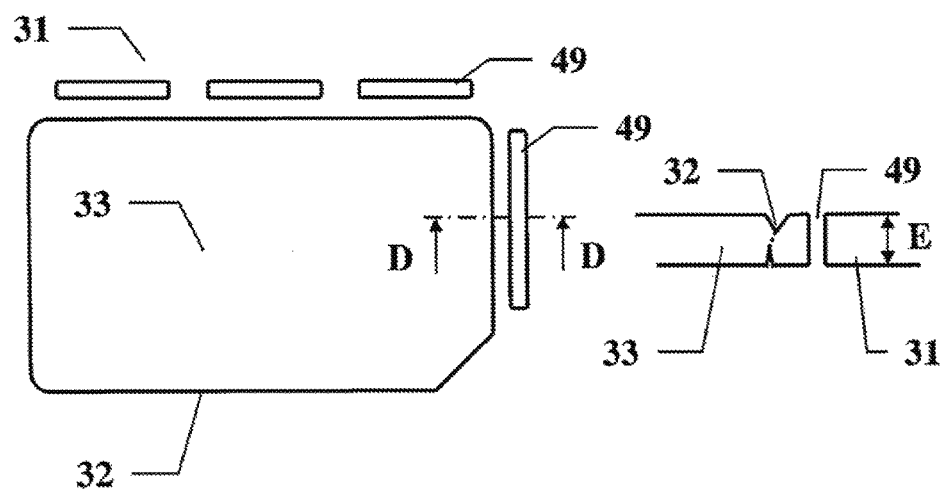

FIG. 7: return punching step;

FIGS. 8 and 9 are section views of a thin plastics card having a weakened profile respectively before and after breaking the material of the residual thickness; and FIGS. 10a and 10b show relaxation cuts respectively from above and in section on D-D.

Figures 1A, 1B:
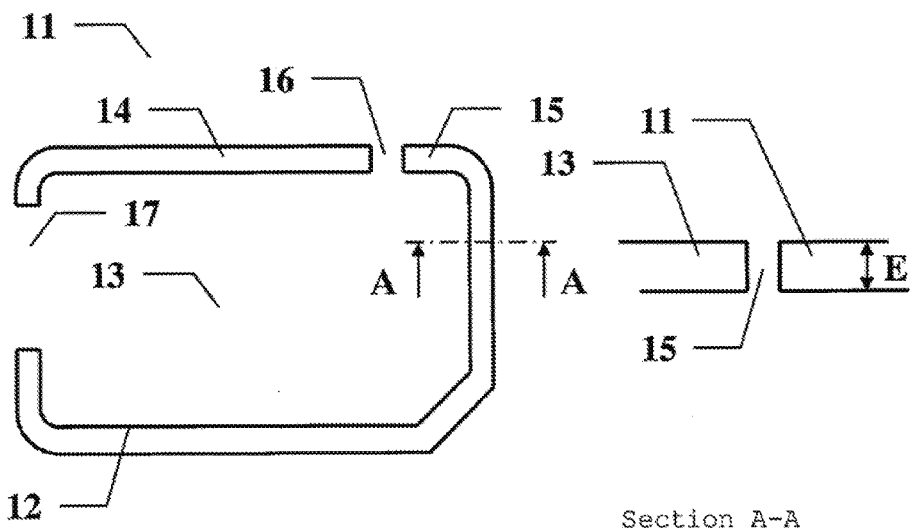
Figures 2A, 2B:
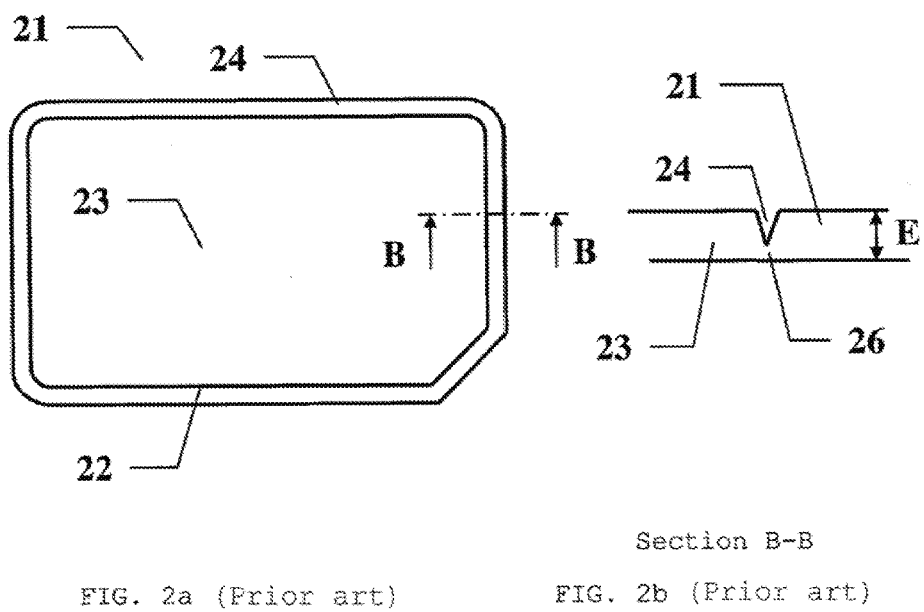
Figure 3:
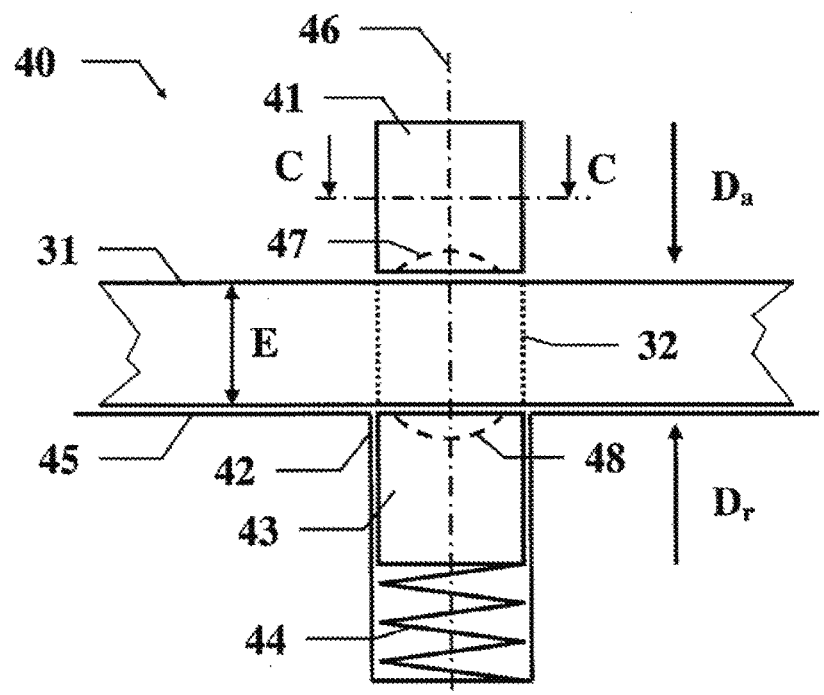
FIG. 3 is a side view of tooling of the invention.

FIG. 3 shows tooling 40 of the invention suitable for weakening an outline 32 in a thin plastics card 31. In this example a thin plastics card 31 extends from a substantially plane card of plastics material of extent in said plane that is large compared with its thickness E. By way of example, such a thin plastics card 31 is a card as defined by the ISO 7816 standard. Such tooling 40 is suitable for receiving such a thin plastics card 31.

At the beginning of the method, the outline 32 does not exist. It is created by the weakening method. For comprehension purposes, the dotted lines show the future location of said outline 32 as made in this way.

The tooling 40 comprises a go punch 41, a return punch 43, and a die 42. The go punch 41 presents a solid shape that is substantially identical to the outline 32 that is to be made.

Figure 4:
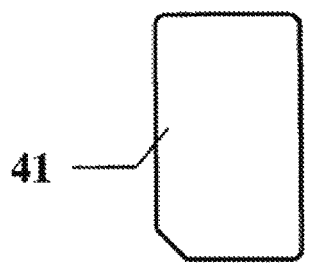
FIG. 4 is a section view on C-C showing a possible profile for a go punch, similar to the profile of the return punch and to the profile of the die.

FIG. 4 shows an example in section C-C of the go punch 41 suitable for making an outline 32 corresponding to a SIM card, which outline is substantially rectangular, with one corner cut off at 45°.

The go punch 41 is suitable for punching the thin plastics card 31 in a go direction $D_a$, in this example in a downward direction in the plane of FIGS. 3 and 5 to 7.

The die 42 presents a hollow shape substantially identical to the outline 32.

The die 42 is in alignment with the go punch 41, with their respective substantially identical sections being superposed along the punching axis 46. The thin plastics card 31 is inserted between the go punch 41 and the die 42. Go punching is thus performed with the go punch 41 sinking into the thickness of the thin plastics card 31 and pressing the thin plastics card 31 against a workplate 45 in which the hollow die 42 is made. The die 42 is thus capable of receiving the material 34 that is pushed by the go punch 41.

The tooling 40 also has a return punch 43. The return punch 43 presents a solid shape that is substantially identical to the outline 32. The thin plastics card 31 is placed between the go punch 41 and the return punch 43. In other words, the return punch 43 is arranged relative to the thin plastics card 31 on the other side of the thin plastics card 31. As a result, the shape of the section of the return punch 43 is symmetrical with the shape of the section of the go punch 41.

The return punch 43 is in alignment with the go punch 41 such that their respective substantially identical sections are superposed along the punching axis 46.

The return punch 43 is suitable for punching the thin plastics card 31 along a return direction $D_r$, opposite to the go direction $D_a$, in this example upwards in the plane of FIGS. 3, and 5 to 7.

The go and return punches 41 and 43 present respective punching faces facing the thin plastics card 31, which faces may be plane. Alternatively, the punching faces may also be indented so as to include a respective recess 47 or 48, with the working portion of said punching face being its outer edge.

With reference to FIGS. 5 to 7, there follows a description of the method of providing weakening along an outline 32 by means of the tooling 40.

Before any operation, a thin plastics card 31 is inserted in the tooling 40 between the go punch 41 and the return punch 43 together with the die 42. The thin plastics card 31 and the tooling 40 are in a configuration similar to that shown in FIG. 3.

The thin plastics card 31 is advantageously pressed against the workplate 45, e.g. by means of a guide that is not shown, for greater clarity.

FIG. 5 shows a first step consisting in a go punching step. During this step, the go punch 41 performs a punching operation and sinks into the thickness E of the thin plastics card 31 through a go stroke $e_a$ in the go direction $D_a$. Since the thin plastics card 31 is placed against the die 42, which is of hollow shape that matches and is in alignment with the shape of the go punch 41, the material 34 that is pushed by the go punch 41 is received in the die 42, which it occupies and takes its shape.

FIG. 6 shows an intermediate step during which the go punch 41 is withdrawn. For this purpose, the go punch 41 is moved along the return direction $D_r$ that is opposite from the go direction $D_a$ of the go punching step, through a withdrawal stroke that is not less than the previously traveled go stroke $e_a$.

FIG. 7 shows a second step consisting in a return punching step. During this step, the return punch 43 performs a return punching operation, pushing back the material 34 that was previously pushed into the die 42 by the go punch, so that it returns to the thin plastics card 31. The return punching step is performed along a return direction $D_r$, opposite to the go direction $D_a$ and presents a return stroke $e_r$. The material 34 previously pushed out from the thickness E of the thin card 31 by the go punching step is thus pushed back into place in said thickness E, at least in part.

Nevertheless, the go and return punching steps have meanwhile produced a first indentation 35 of depth substantially equal to the go stroke $e_a$ of the go punch 41 starting from the surface of the thin plastics card 31 situated beside the go punch 41, and a second indentation 36 of depth substantially equal to the return stroke $e_r$ of the return punch 43, starting form the other surface of the thin plastics card 31 situated beside the return punch 43. These two indentations 35, 36 are arranged substantially facing each other and in register with the line desired for the outline 32, thus providing a weakened outline.

The portion 33 defined by the indentations 35 and 36 forming said outline 32, which portion may be a small format card 33, remains secured to the thin plastics card 31, but can also be detached therefore by applying pressure, e.g. by hand, serving to break the residual thickness R that remains intact.

It may be observed that the method as described above can easily be applied to making at least two concentric weakened outlines, even if they are very close together. The various go and return punching operations may even be performed in a single operation, e.g. by means of respective go and return punches that are telescopic.

It may be observed that the step of withdrawing the go punch 41 may take place before or after the return punching step. In a first implementation, shown in FIG. 6, the go punch 41 is withdrawn along the go direction $D_r$ in order to release space and allow the return punching step to take place. In a second implementation, the return punching step pushes back the previously deformed material 34 along the return direction $D_r$. The material 34 in turn pushes against the go punch 41 and thus causes the go punch 41 to be withdrawn.

The return stroke $e_r$ of the return punch 43 during the return punching step may be less than the go stroke $e_a$ of the go punch 41. Under such circumstances, the material 34 moved during the go punching step is not totally replaced in the thickness E of the thin plastics card 31 and remains a little lower, projecting from one of its faces, and specifically its bottom face.

The return stroke $e_r$ of the return punch 43 during the return punching step may be greater than the go stroke $e_a$ of the go punch 41. Under such circumstances, the material 34 moved during the go punching step passes through the thickness E of the thin plastics card 31 and moves beyond it so as to project from its other face, and specifically its top face.

According to a preferred characteristic, the return stroke $e_r$ of the return punch 43 during the return punching step is taken to be substantially equal to the go stroke $e_a$ of the go punch 41. In this way, the material that is initially arranged in the thickness E of the thin plastics card 31 in register with the go and return punches 41 and 43 is replaced in the same thickness E. Nothing projects from either of the faces of the thin plastics card 31.

In order to ensure that the internal portion 33 of the outline 32 remains secured to the thin plastics card 31, it is appropriate for a residual thickness R of intact material to remain. This residual thickness R is equal to the difference between the thickness E of the thin plastics card 31 and the sum of the depths of the first indentation 35 and of the second indentation 36.

The depth of the first indentation 35 is substantially equal to the go stroke $e_a$ of the go punch 41. The depth of the second indentation 36 is substantially equal to the return stroke $e_r$ of the return punch 43. The term "sum" is used herein to mean the sum of the absolute values, i.e. $|e_a|+|e_r|$. To ensure that a residual thickness R remains, it is appropriate for the sum of the go stroke $e_a$ plus the return stroke $e_r$ to remain less than the thickness E of the thin plastics card 31.

In other words:

$$R=E-(|e_a|+|e_r|)$$

so as to ensure that R>0, it is necessary for $E>|e_a|+|e_r|$.

By combining the above two characteristics, namely the return stroke $e_r$ of the return punch 43 being equal to the go stroke $e_a$ of the go punch 41, i.e. $e_a=e_r$, and a remaining residual thickness R, i.e. R>0, $E>|e_a|+|e_r|$, it follows that for a residual thickness R to exist, it is necessary for the return stroke $e_r$ of the return punch 43, which is equal to the go stroke $e_a$ of the go punch 41, to be less than 50% of the thickness E of the thin plastics card 31. Given that $E>|e_a|+|e_r|$, and $e_a=e_r$, then $E/2>|e_a|$ and $E/2>|e_r|$.

In the limit, if the thickness E of the thin plastics card 31 is equal to the sum $|e_a|+|e_r|$ of the stroke $e_a$ and $e_r$, it can be seen that the residual thickness R becomes zero.

This can be harmful for securing the portion 33 with the thin plastics card 31. It is therefore preferable to retain a certain margin. Successive tests have shown that a margin R of at least 5% of the thickness E of the thin plastics card 31 is satisfactory for ensuring good retention, while providing weakening that makes detachment easy. Thus, the difference R between the thickness E of the thin plastics card 31 and the sum $|e_a|+|e_r|$ of the go stroke $e_a$ of the go punch 41 plus the return stroke $e_r$ of the return punch 43 is advantageously at least 5% of the thickness E of the card 31. The difference R may be greater, up to a value of 100%, corresponding to no pre-cutting and thus no gap. It should be observed that the greater the value of the difference R, the more difficult it becomes to break the outline in order to separate the small format card 33. Thus, a value lying in the range 5% to 20% is advantageously preferred.

In order to ensure that the go punching operation takes place correctly in the die 42, it is appropriate for there to be a small amount of clearance, of the order of a few micrometers to a few tens of micrometers between the shape of the go punch 41 and the shape of the die 42, the die being slightly larger.

In other words, the three shapes of the go punch 41, of the return punch 43, and of the die 42 are substantially identical to the shape of the outline 32, but the shape of the go punch 41 is inscribed within the outline 32, while the shape of the die 42 is circumscribed around the outline 32.

Thus, although the shape of the return punch 43 is identical to the shape of the go punch 41, its shape is nevertheless inscribed within the shape of the die 42, leaving a certain amount of clearance. This clearance allows the return punch 43 to be placed inside the die 42 and to be capable of sliding freely therein.

In a first embodiment, the return punch 43 is actuated independently of the go punch 41. The return punch 43 is withdrawn to a sufficient distance from the thin plastics card 31 or is at least free to be moved passively during the go punching step. In analogous manner, the go punch 41 is withdrawn to a sufficient distance from the thin plastics card 31 or is at least free to be moved passively during the return punching step. The method is then performed as two independent operations, a go punching step in which the go punch 41 is driven by a first actuator, followed by a return punching step in which the return punch 43 is driven by a second actuator.

In another embodiment, the return punch 43 includes return means 44. The return means 44 are arranged in such a manner as to be loaded by thrust from the return punch 43 along the go direction $D_a$ so as to be ready for urging the return punch 43 along the return direction $D_r$ when the thrust ceases.

Thus, and advantageously, during the go punching step, the go punch 41 moves along the go direction $D_a$. As a result it moves the material 34. The return punch 43, which is free to slide along said go direction $D_a$, is then moved under drive from the material 34 pushing it along the go direction $D_a$. During this movement, the return punch 43 acts against the return means 44, loading them to create a return force.

At the end of the go punching step, the go punch 41 is withdrawn, being moved along the return direction $D_r$. In so doing, it ceases to exert thrust on the material 34 and the return punch 43. The return punch 43 as released in this way is then subjected solely to the return force exerted by the return means 44. Under the effect of this return force, the return punch 43 is moved along the return direction $D_r$ and then performs the return punching step.

Advantageously, in this second embodiment, only one actuator is needed for actuating the go punch 41. The return punch 43 is actuated passively by the return means 44 in response to the go punching step.

FIG. 8 shows the result of the above-described method, at the end of the method, and prior to breaking the intact material: a thin plastics card 31 has a weakened outline 32 defining a small format card 33 that is secured to the thin plastics card 31 by the fact that there remains material that has not been indented and that remains over a residual thickness R. Such an assembly can thus be used in a card reader for cards having the format of the thin plastics card 31.

FIG. 9 shows the result of the above-described method, at the end of the method and after breaking through the intact material. This breaking is typically done by pressing manually against the small format card 33, preferably in the return direction $D_r$. This separates the small format card 33 from the thin plastics card 31.

It should be observed that the method comprising a go punching step followed by a return punching step is not symmetrical. It is therefore not surprising that the result it produces is not symmetrical. The notch 35 on the same side as the go punch 41 is formed during the go punching step that stretches the material in free manner, and by said material being put back into place by the return punching step. This tends to produce a notch 35 that is relatively wide and thus situated outside the outline 32 to a greater extent than the other notch 36. In contrast, the notch 36 beside the return punch 43 is formed by the go punching step, but in a manner that is constrained by the die 42 and by said material being put back into place by the return punching step. This tends to produce a notch 36 that is relatively narrow and that is thus situated more within the outline 32 than is the notch 35.

This leads to several consequences. The relatively wider opening of the notch 35 on the go side creates a difference between the profile 37 of the thin plastics card 31 and the profile 38 of the small format card 33 on the go side. Towards the go side face, the plastics card 31 presents a profile 37 that is flared, opening out facing the go direction $D_a$. In contrast, the small format card 33 presents a tapering profile 38 towards the go face.

The relative narrowness of the notch 36 on the return side leads to respective profiles 37 and 38 of the thin plastics card 31 and of the small format card 33 that are more similar on the return side.

The offset between the outermost position of the notch 35 on the go side and the innermost position of the notch 36 on the return side leads to the zone 47, 48 resulting from breaking the residual material having a slope. This slope is in the same direction as the flare of the notch 35 towards the go side, and it extends the flare of the profile 37 of the thin plastics card 31. Thus, and as can be seen in FIG. 9, the profile 37 of the thin plastics card 31 is flared over more than half the thickness E, and more precisely over a height that is substantially equal to the go stroke $e_a$ plus the residual thickness R, with the flare opening out facing the go direction $D_a$.

Depending on the conditions under which the notches 35 and 36 are made, which conditions may vary in terms of the load applied during the punching steps and in terms of the speeds of punching, it is possible to vary the shapes of the notches 35 and 36, and thus of the profiles 37 and 38. Thus, the mean slope of the flare may vary with an angular value lying in the range 1° to 10°. In order to ensure that the above-described advantageous properties are clearly perceptible, it is preferable to have a mean slope lying in the range 4° to 8°. The angle values are specified for measurements relative to the normal to the surface of the card 31.

The respective shapes of the notches 35 and 36, and the offset of the notches 35 and 36 relative to each other lead to the profile 38 of the small format card 33 being given a substantially S-shaped. As can be seen in FIG. 9, the profile 38 may be subdivided into three zones along the thickness direction. In a first zone, close to the go side surface, the profile 38 is substantially re-entrant. In a central second zone, corresponding to the breakage zone 48, the profile 38 changes orientation and is oriented substantially parallel to the breakage zone 47 of the card 31, flaring towards the go direction $D_a$. In a third zone, close to the surface on the return side, the profile 38 changes orientation once more. These two changes of orientation give the profile 38 of the small format card a shape that can be described as being S-shaped or Z-shaped.

Surprisingly, the combination of these two shapes for the profiles 37 and 38 leads to the following advantageous properties. Because of the flare, the detachable portion constituted by the small format card 33 can be extracted from the thin plastics card 31 much more easily from the open side of the flare, i.e. along the return direction $D_r$, then it can from the other side.

Because of the shapes of the two profiles 37 and 38, after the small format card 33 has been extracted, it can nevertheless be replaced in the thin plastics card 31. This putting back into place is more easily done from the same face in the go direction $D_a$, and it is found to be considerably more difficult to do from the other face in the return direction $D_r$. The flare of the profile 37 of the thin plastics card 31 together with the shape of the profile 38 of the card 31, mainly in the breakage zone 48, ensures that the small format card 33 comes into abutment inside the thin plastics card 31 substantially at the same level that it occupied initially, before weakening the card. Thus, even after the residual material connecting together a small format card 33 and an adapter of larger format 31 has been broken, said small format card 33 can be put back into place in said larger format adapter 31 in order to be used in a large format reader. This is advantageous in that most readers are suitable for providing a holding/abutment force in a direction opposite to that provided by the flare.

Also advantageously, the combination of the shapes of the profiles 37 and 38, more particularly in the portion between the zone close to the return side and the breakage zone 47, 48, with the change in orientation of the profile 37 of the thin plastics card 31 and with the corresponding change of orientation in the facing profile 38 of the small format card 33, provides a snap-action effect that serves to hold the small format card 33 in place once it has been put back into place in the thin plastics card 31.

As a direct result of being broken, the surface state of the breakage zones 47, 48 is more disturbed and presents greater roughness that may go so far as to include breakage flash being present. This surface state present on the two breakage zones 47, 48 that face each other after the small format card 33 has been put back into place further contributes to holding the small format card 33 in place, even though breakage has already been performed.

The method of the invention thus creates a weakened profile 32 that can be broken in order to separate a small format card 33 from a thin plastics card 31. This separation is advantageously reversible, since the small format card 33 can be put back into place, where it is held in satisfactory manner. The small format card 33 can thus be extracted at will in order to be used on its own or pushed back into place in order to be used, e.g. in a format adapter 31.

The go punching step stretches the material of the thin plastics card 31. The volume of material thus increases. Thus, during the return punching step, which replaces material in the thickness card 31, but without being capable of compressing the material, pressure stress appears inside the material, which stress is located mainly in the weakened outline 32.

Thus, and as shown in FIGS. 10*a* and 10*b* which are respectively a face view and a profile view, a card 31 in which a weakened outline 32 has been formed to define a small format card 33 advantageously also has a relaxation cut 49 formed therein. By way of example, this relaxation cut 49 that passes through the thickness E of the thin plastics card 31 may be of elongate shape and substantially aligned with the outline 32. Thus, deformation of this cut 4 having two long edges that can move towards each other, advantageously makes it possible to relax any compression stress that arises while forming the adjacent outline 32. Such a relaxation cut 49 may be placed equally well on either side of the outline 32.

It is possible to apply the above-described method at least once more in order to weaken a second outline. For this purpose, the method comprises a second go punching step by means of a second go punch presenting a solid shape that is substantially identical to the shape of the second outline. The second go punch is suitable for punching the thin plastics card along a second go direction against a second die presenting a hollow shape that is substantially identical to the second outline and that is in alignment with the second go punch in order to be capable of receiving the material pushed by the second go punch. Thereafter, the method has a second return punching step using a second return punch presenting a solid shape substantially identical to the second outline, in alignment with the second go punch and suitable for punching the thin plastics card along a second return direction opposite to the second go direction.

It is thus possible to make two or more nested weakened outlines in succession. When making multiple nested outlines, it is advantageous for the outlines to be made in a centrifugal order, starting with the smallest and going towards the largest.

It is possible to perform the second go and return punching steps in the same directions as the go and return punching steps. This is advantageous in that there is no need to turn over the tooling or the card 1 between the punching steps for the outline 32 and the second punching steps for the second outline. Under such circumstances, the second go direction is identical to the go direction $D_a$, and the second return direction is identical to the return direction $D_r$.

Alternatively, it is possible to alternate. Under such circumstances, the second go direction is identical to the return direction $D_r$, and the second return direction is identical to the go direction $D_a$. This is advantageous with respect to the above-described flare.

As described above, the weakening method and more particularly the sequencing of the go and return punching steps leads to a flared profile being created that opens towards the go side. This facilitates extracting and/or putting back into place the card 33 contained within the profile 32 via the go side.

By alternating the go and return directions of the weakening method between a first outline 32 and a second outline, the flared directions are thus caused to alternate: the flare of the first outline 32 opens towards a first direction, namely the go direction $D_a$, while the flare of the second outline opens towards the opposite direction.

This is advantageous in that extracting and/or putting back into place the card 33 contained within the profile 32 is easier from one side, in this example from the go side, while extracting and/or putting into back into place the portion contained in the second profile is easier from the opposite side. Such an arrangement thus provides error-proofing means. This makes it possible while breaking an outline to avoid breaking the wrong outline.

The above-described method makes it possible to provide at least two nested outlines, the inner outline 32 defining a small format card 33 and the outer, second outline defining an adapter for larger format.

A particularly advantageous application lies in making a card 33 of 4FF format together with an adapter of 3FF format.

It is also possible to nest other outlines inside or around the second outline. It is thus possible to provide an all-in-one unit comprising a card of 4FF format surrounded by a 3FF adapter, in turn surrounded by a 2FF adapter, and all contained within a 1FF format card 31.

With such nested outlines, a question may arise as to determining the minimum distance that needs to be allowed between two consecutive outlines. Although the answer to this question depends on the plastics material being used, tests have enabled a minimum width of 300 μm to be achieved between two adjacent outlines with commonly used plastics materials.

Such a value is particularly advantageous in that it is less than the mean distance of 330 µm that can be deduced from the ETSI standard between an outline of 4FF format and an outline of 3FF format, as occurs between the top horizontal edges of those formats.

This characteristic thus guarantees that it is feasible to make a 4FF format card that is included within its 3FF format adapter, with it being possible to make both of the outlines, the outline of the card and the outline of the adapter by performing the method.

The invention claimed is:

1. A method, comprising:
   weakening a first outline in a thin plastic card, wherein weakening the first outline comprises:
      a first go punching step by means of a first go punch presenting a solid shape substantially identical to the first outline and suitable for punching the thin plastic card along a go direction against a first die presenting a first hollow shape substantially identical to the first outline and in alignment with the first go punch;
      receiving a first material pushed by the first go punch into the first hollow shape of the first die; and
      a first return punching step by means of a first return punch presenting a solid shape substantially identical to the first outline in alignment with the first go punch and suitable for punching the first material along a return direction opposite to the go direction; and
   weakening a second outline in the thin plastic card, wherein weakening the second outline comprises:
      a second go punching step by means of a second go punch presenting a solid shape substantially identical to the second outline and suitable for punching the thin plastic card in a second go direction against a second die presenting a second hollow shape substantially identical to the second outline and in alignment with the second go punch;
      receiving a second material pushed by the second punch into the second hollow shape of the second die; and
      a second return punching step by means of a second return punch presenting a solid shape substantially identical to the second outline in alignment with the second go punch and suitable for punching the second material along a second return direction opposite to the second go direction.

2. The method according to claim 1, wherein a return stroke of the first return punch is substantially equal to a go stroke of the first go punch.

3. The method according to claim 1, wherein the sum of a go stroke of the first go punch plus a return stroke of the first return punch is less than the thickness of the thin plastic card so as to leave remaining a residual thickness of intact material.

4. The method according to claim 1, wherein the difference between a thickness of the thin plastic card and the sum of a go stroke of the first go punch plus a return stroke of the first return punch lies in the range 5% to 100% of the thickness of the thin plastic card.

5. The method according to claim 1, wherein the first return punch includes return means loaded by thrust from the first return punch along the go direction so as to urge the first return punch along the return direction when the thrust ceases.

6. The method according to claim 1, further including a step of making a relaxation cut arranged in the proximity of the first outline and suitable for deforming so as to release stresses created by the first go and return punching steps.

7. The method according to claim 1, wherein the second go direction is identical to the go direction.

8. The method according to claim 1, wherein the second go direction is identical to the return direction.

9. The method according to claim 1, wherein the second outline circumscribes the first outline.

10. The method according to claim 1, wherein the distance between the first outline and the second outline is greater than or equal to 300 µm.

11. Tooling suitable for performing the method according to claim 1 in order to weaken the first outline in the thin plastic card.

12. A thin plastic card including the first outline weakened by the method according to claim 1.

13. The thin plastic card according to claim 12, wherein an outer profile of the first outline after breaking material of a residual thickness presents a substantially flared shape opening out facing the go direction.

14. The thin plastic card according to claim 13, wherein said substantially flared shape presents a mean slope relative to the normal lying in the range 1° to 10°, and preferably in the range 4° to 8°.

15. The thin plastic card according to claim 12, wherein an inner profile of the first outline after breaking material of a residual thickness presents a shape that is substantially S-shaped.

16. The method according to claim 1, wherein the first die does not cut the thin plastic card.

17. The method according to claim 1, wherein the first die includes a workplate defining the first hollow shape, and the first hollow shape is aligned with the first go punch and configured to receive the first material pushed by the first go punch.

* * * * *